No. 748,659. PATENTED JAN. 5, 1904.
M. P. SCHENCK.
GOVERNOR FOR WATER WHEELS.
APPLICATION FILED FEB. 10, 1897.
NO MODEL. 5 SHEETS—SHEET 1.

Witnesses:
Herbert Bradley
Fred R. Proctor

Inventor
Marcus P. Schenck
By Knight Bros
Atty's

No. 748,659. PATENTED JAN. 5, 1904.
M. P. SCHENCK.
GOVERNOR FOR WATER WHEELS.
APPLICATION FILED FEB. 10, 1897.
NO MODEL. 5 SHEETS—SHEET 2.

Witnesses: Inventor:
Herbert Bradley Marcus P. Schenck
Fred L. Proctor By Knight Bros.
Attys.

No. 748,659. PATENTED JAN. 5, 1904.
M. P. SCHENCK.
GOVERNOR FOR WATER WHEELS.
APPLICATION FILED FEB. 10, 1897.
NO MODEL. 5 SHEETS—SHEET 3.

Witnesses:
Herbert Bradley
Fred R. Proctor

Inventor
Marcus P. Schenck
By Knight Bros
Atty's

No. 748,659. PATENTED JAN. 5, 1904.
M. P. SCHENCK.
GOVERNOR FOR WATER WHEELS.
APPLICATION FILED FEB. 10, 1897.
NO MODEL. 5 SHEETS—SHEET 4.

Witnesses:
Herbert Bradley
Fred R. Proctor

Inventor
Marcus P. Schenck.
By Knight Bros
Atty's

No. 748,659. PATENTED JAN. 5, 1904.
M. P. SCHENCK.
GOVERNOR FOR WATER WHEELS.
APPLICATION FILED FEB. 10, 1897.
NO MODEL. 5 SHEETS—SHEET 5.
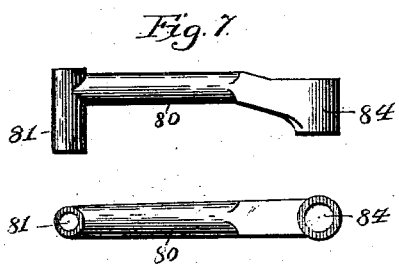
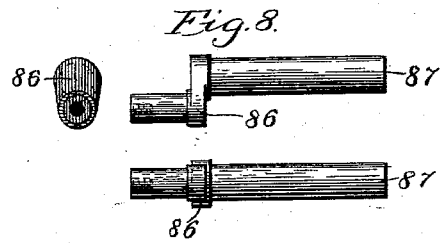
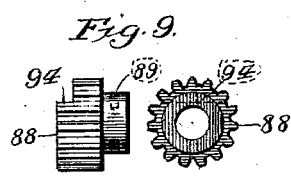
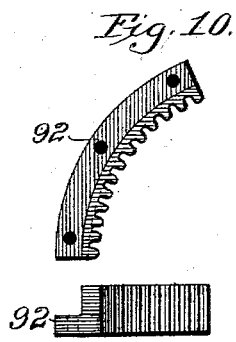
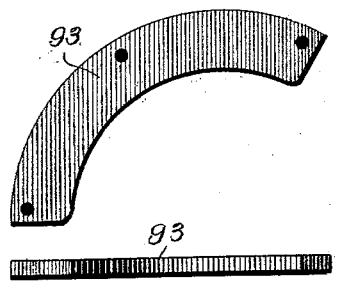
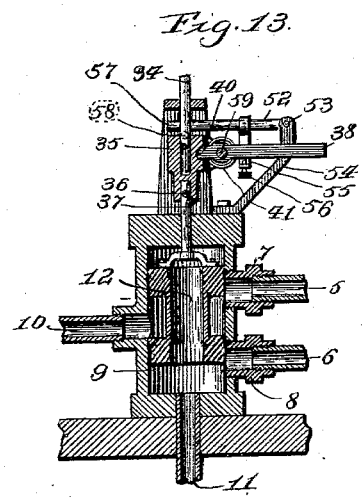
Witnesses:
Herbert Bradley
Fred R. Proctor
Inventor
Marcus P. Schenck
By Knight Bros
Atty's No. 748,659. Patented January 5, 1904.

UNITED STATES PATENT OFFICE.

MARCUS P. SCHENCK, OF SPRINGFIELD, MASSACHUSETTS, ASSIGNOR TO THE SCHENCK GOVERNOR COMPANY, OF MERIDEN, CONNECTICUT, A CORPORATION OF CONNECTICUT.

GOVERNOR FOR WATER-WHEELS.

SPECIFICATION forming part of Letters Patent No. 748,659, dated January 5, 1904.

Application filed February 10, 1897. Serial No. 622,824. (No model.)

*To all whom it may concern:*

Be it known that I, MARCUS P. SCHENCK, a citizen of the United States, residing at Springfield, in the county of Hampden and State of Massachusetts, have invented a certain new and useful Improvement in Governors for Water-Wheels, of which the following is a specification.

My invention relates to apparatus whereby the volume of water supplied to a water-motor will be automatically regulated according to the load which is on the machinery and to that class of such devices which employ a prime mover or a motor for imparting motion to a winding-shaft or equivalent connection employed for opening and closing the water-gate and a valve for controlling the motor which may be employed for actuating the winding-shaft.

My invention consists in certain novel features of construction and combinations of parts, which will be hereinafter described, and particularly pointed out in the claims.

Figure 1:
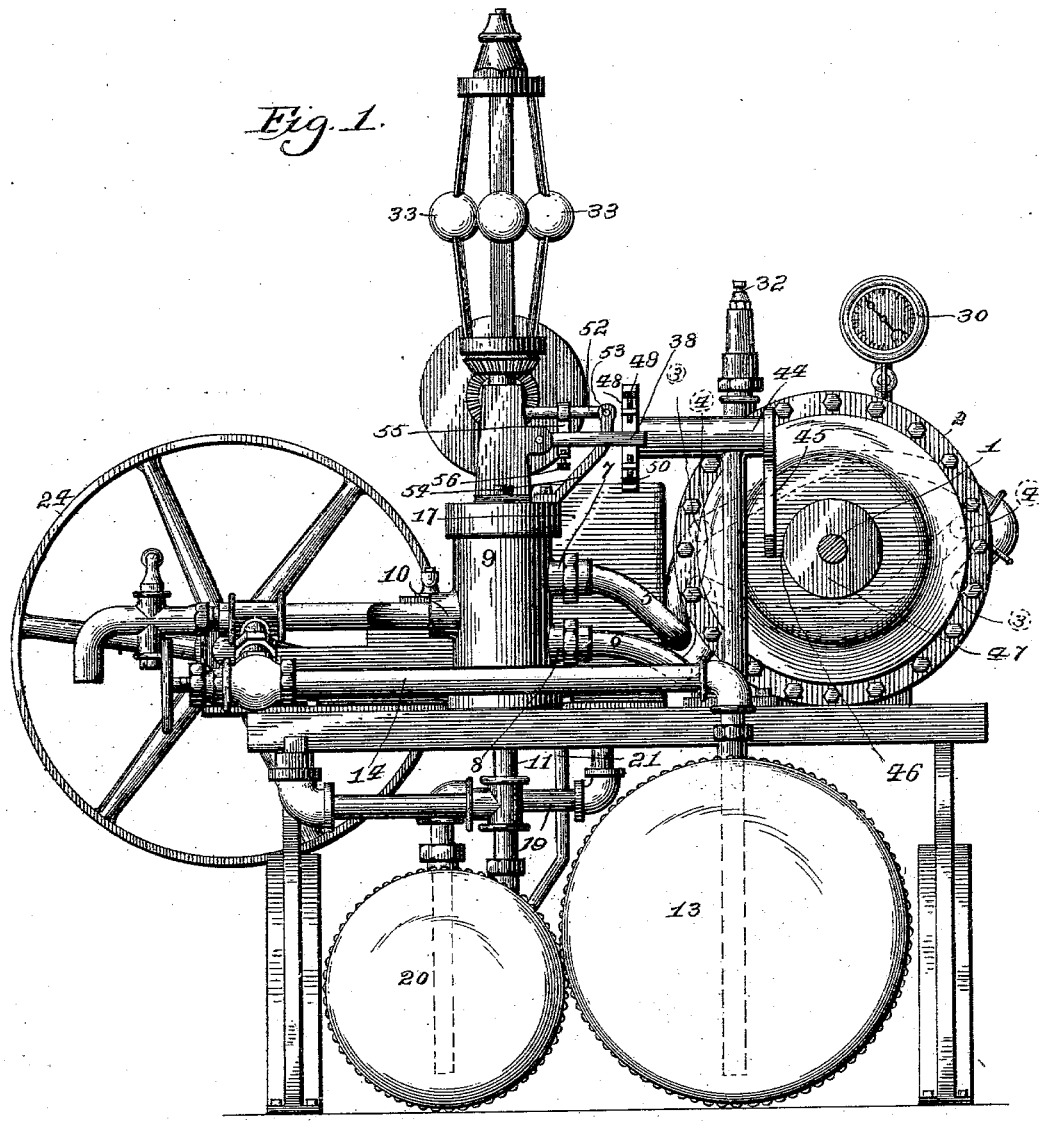
Figure 2:
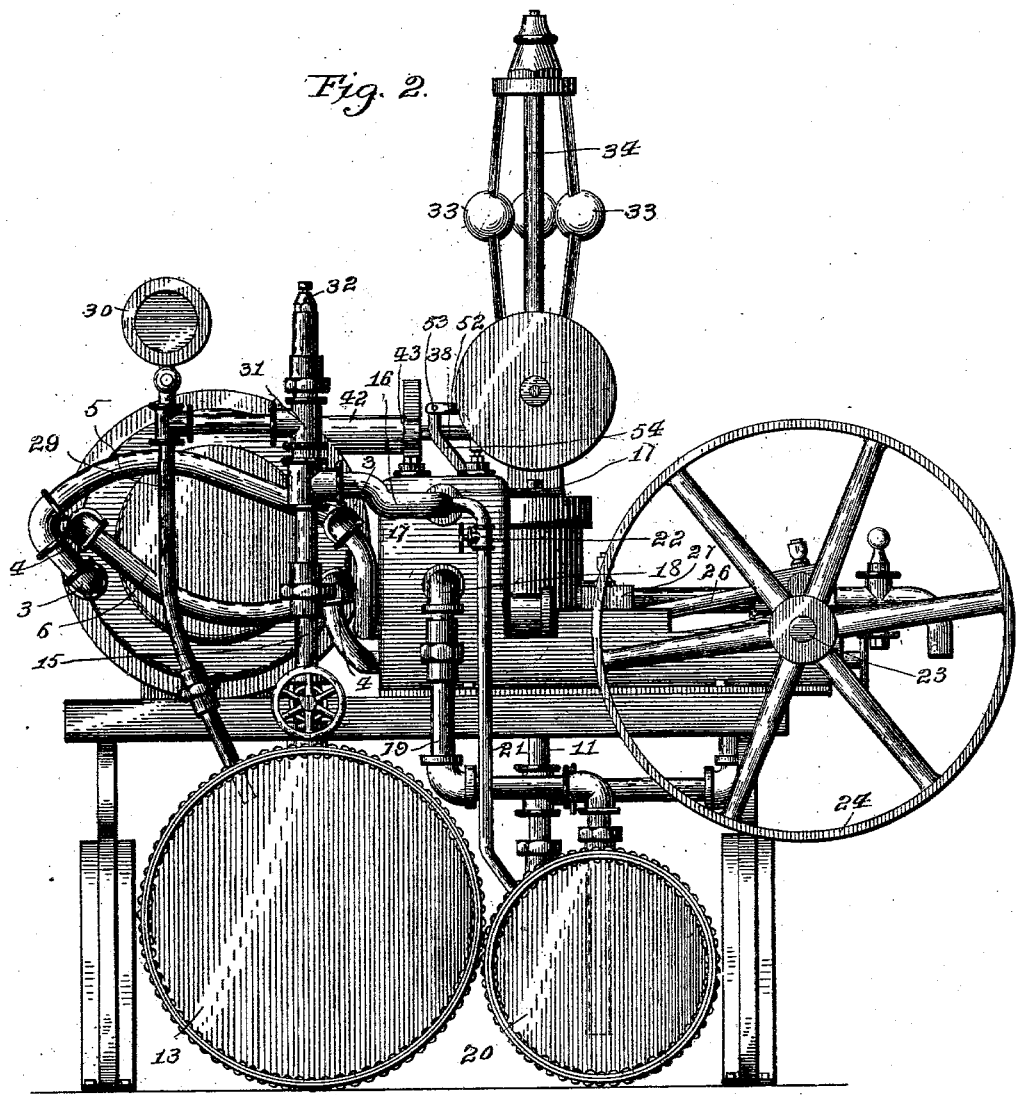
Figure 3:
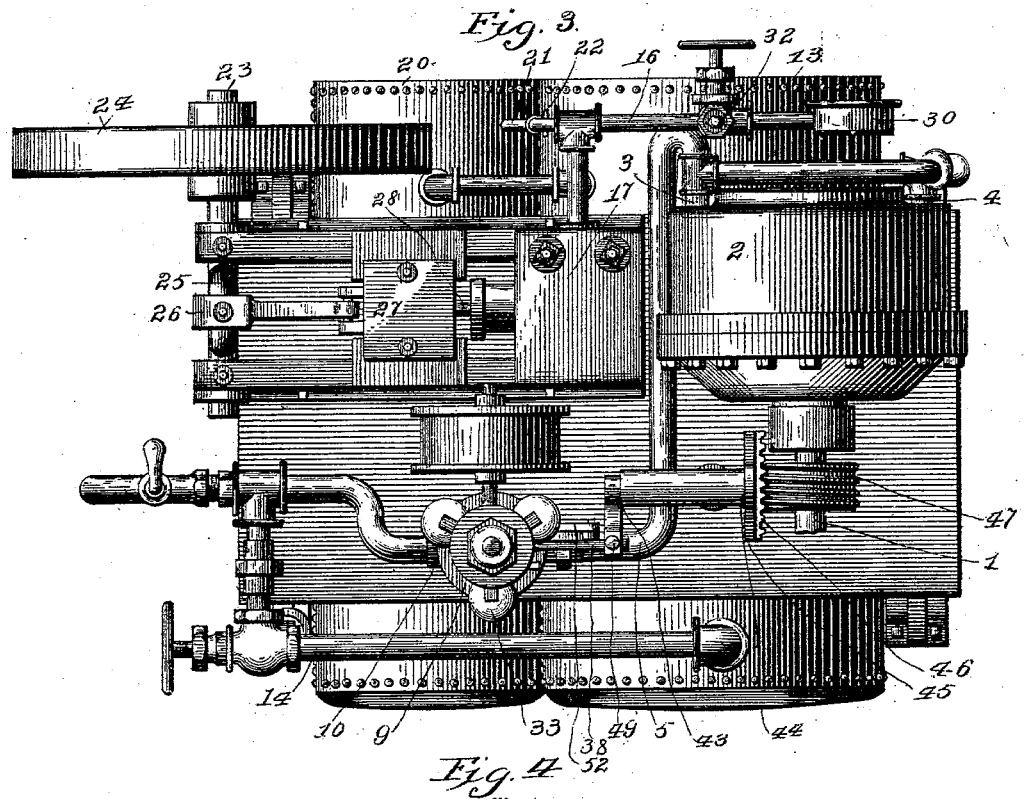
Figure 4:
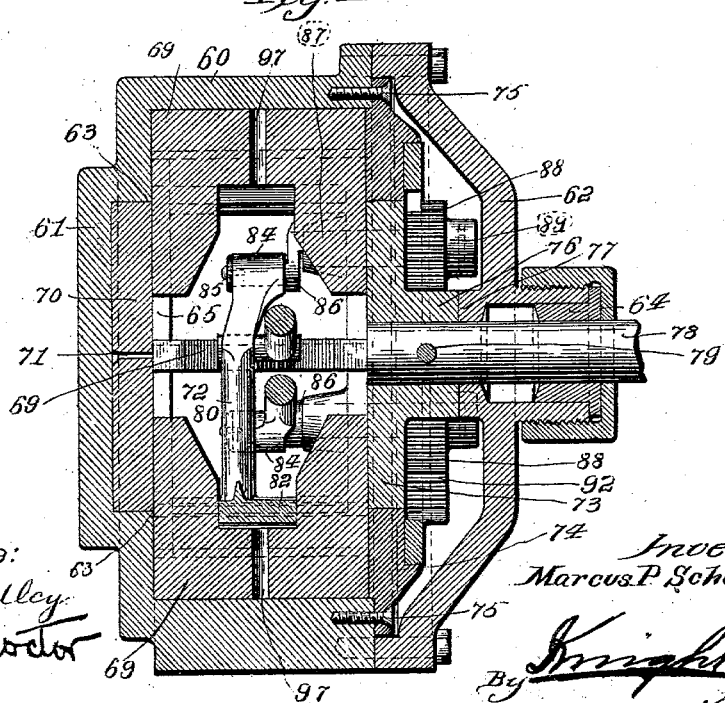
Figure 5:
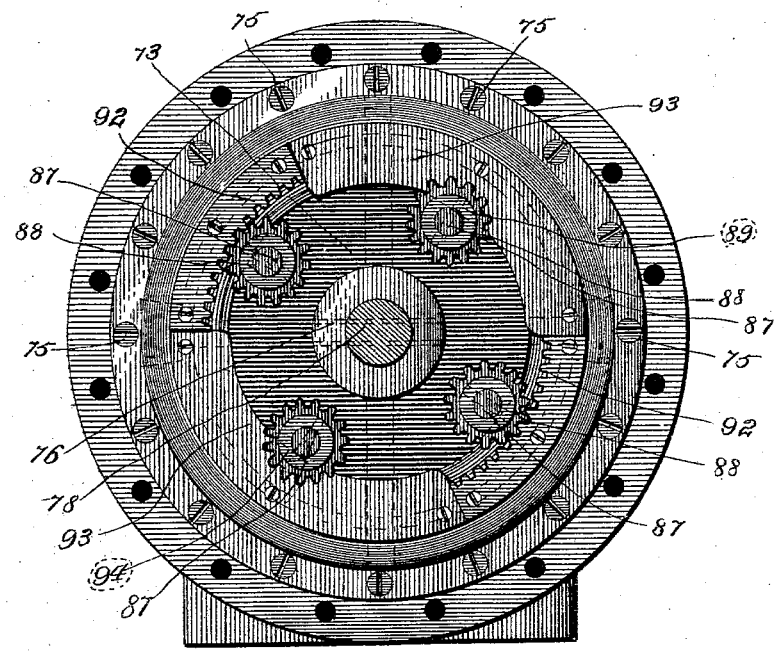
Figure 6:
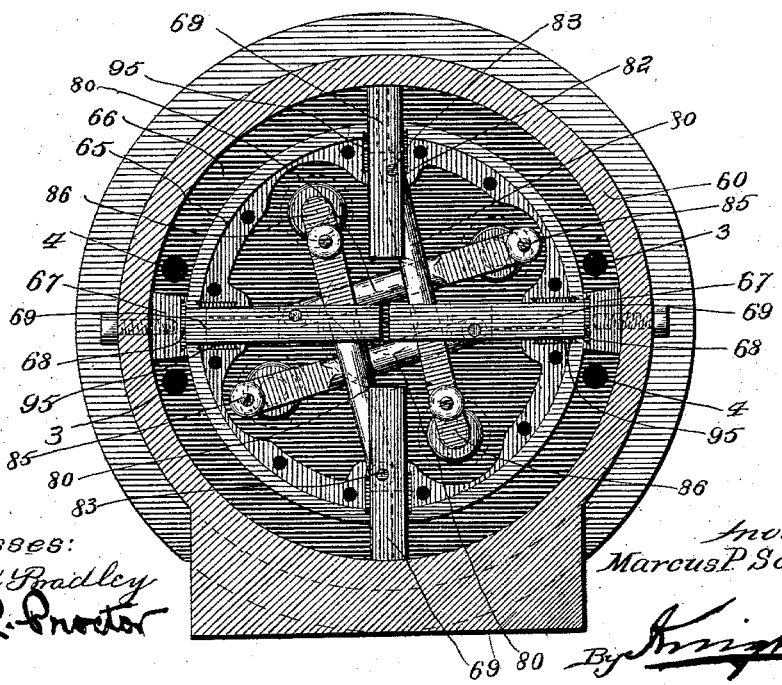

In the accompanying drawings, forming a part of this specification, Figure 1 is a side elevation of the complete apparatus. Fig. 2 is a similar view of the opposite side. Fig. 3 is a plan of the same. Fig. 4 is a vertical axial section of the motor. Figs. 5 and 6 are respectively a transverse section showing the removable end of the cylinder removed and a transverse section showing the clamping-ring removed. Fig. 7 represents in different views one of the pitmen forming part of the reciprocating connection for the gates. Fig. 8 shows similar views representing the crank. Fig. 9 shows views representing the construction of the gear-wheel for rotating the crank. Fig. 10 represents the construction of the segmental rack. Fig. 11 represents the construction of one of the locking-plates for holding the gear-wheels against rotation while moving from one rack to the other. Fig. 12 represents the construction of the blocks for dividing the pressure-chamber into compartments. Fig. 13 is a sectional detail of the governor.

1 represents the shaft, which may be the winding-shaft for controlling the water-wheel gate or may be indirectly connected therewith.

2 is a rotary motor suitably connected with the shaft 1 and of a construction to be hereinafter described. The motor receives fluid-pressure through diametrically opposite ports 3 to wind up the connection which opens the gate, or it may receive fluid-pressure through the diametrically opposite ports 4 to cause rotation of the motor in a direction to close the water-gate.

5 and 6 are pipes which conduct fluid-pressure to the ports 3 and 4 from their outlets 7 and 8 of a valve 9. 10 represents the inlet of said valve 9, and 11 the exhaust or outlet. When the valve is moved upward and the supply-port 10 is in communication with the outlet 7, the motor will be rotated in a direction to open the water-gate, the exhaust escaping from said motor through the port 4, pipe 6, and passage 8 beneath the valve to the outlet 11. If, however, the position of the valve is reversed, the exhaust takes place through ports 3, pipe 5, and passage 7, and hollow valve-plug 12 to the outlet 11, while the fluid-pressure is transmitted from the inlet 10 through passage 8, pipe 6, and port 4, so that the motor will be rotated in a direction to close the water-gate.

Fluid-pressure is developed in a tank 13, in which air is trapped and into which oil is pumped to the extent indicated by the dotted line, such pressure serving to drive out the oil which I employ as the pressure medium through pipe 14 to the inlet 10. Oil is constantly supplied to the pressure-chamber 13 through a pipe 15, which leads from the discharge-port 16 of a pump 17, said pump receiving oil through inlet 18 and pipe 19, which leads from storage-tank 20. The exhaust 11 also communicates with tank 20 to avoid a waste of oil.

21 represents a pipe leading from the head of the pump back to the storing-tank and under control of a valve 22 in order to permit the escape of air from the pump when starting.

23 represents a counter-shaft driven by a pulley 24, which receives motion from any suitable source. A crank 25 in said countershaft is connected by a pitman 26 with the slide-block 27 of the pump-piston 28 and whereby operates said pump.

From so much of the description it will be seen that I have provided a motor controlling the winding-shaft, a pressure-tank for supplying fluid-pressure to the motor, a valve for controlling the supply of said pressure, and a pump for continuously taking the oil which is returned from the motor and delivering it under pressure to the pressure-tank. The operation of the pump is such that it maintains a partial vacuum in the storage-tank 20. The pressure-tank may have a stand-pipe 29 with pressure-gage 30 and a safety-valve 31 with blow-off 32.

It now remains to describe a suitable governor for controlling the valve 9. This may consist of the common form of ball-governor 33, central rod 34 of which extends down and enters a sleeve 35, fixed by a pin 36 upon the upper end of a valve-stem 37. The governor is thereby adapted to depress the valve as the speed passes a certain point, and thereby admit fluid-pressure to the motor through the ports 4 and cause a slight closing of the water-gate. If, however, the governor is rotated at a rate of speed which is too slow, the rod 34 is drawn up again. In order now to raise the valve so as to discontinue the closing movement of the gate, a lever 38, fulcrumed at 39 and engaging the sleeve 35 at 40, carries a spring 41, which rocks the lever upon its fulcrum and lifts the valve-stem 37 as far as permitted by the governor. If the governor slows down sufficiently, the lever 38 will raise the valve far enough to supply fluid-pressure to the motor through the ports 3 and open the gate to let on more water. It will readily be seen that the adjustment of these parts is such that they may change in the speed of the governor from one side or the other of the normal rate of rotation, will be immediately and accurately compensated for by shifting of the valve and constant changes in the amount of water permitted to flow, and the governor thereby immediately restored to normal position. Should, however, the application of the fluid-pressure be continued in either direction to the motor until said motor moves the gate to either limit of its movement, the valve will be returned to an intermediate position and fluid-pressure entirely cut off by the following means.

42 is a rock-shaft journaled at 43 and 44 and carrying at one end a segment-rack 45, having teeth 46 at its lower end, which are engaged by a worm 47 on the shaft 1, so that as said shaft rotates it will impart movement to the segment 45 and rock the shaft 42. The rock-shaft carries upon its other end a bifurcated lever 48, carrying set-screws 49 and 50, which when the segment 45 is moved to either limit come in contact with the lever 38 and move it to an intermediate position whether it be up or down, and thereby set the valve-plug 12 to a position which cuts off the supply of fluid-pressure. By this means the apparatus is rendered incapable of doing any damage by continuing the rotation of the motor too long.

As a further safety device to cause the apparatus to immediately shut off the water entirely in case of accident, such as slipping the belt, I employ a lever 52, fulcrumed at 53 on an arm 54, which projects up from the base of the governor, and said lever carries a lifting-arm 55, in which is a set-screw 56, engaging beneath the lever 38, while the free end 57 of the lever 52 is engaged by a pin 58 in the governor-rod 34. When anything happens to the apparatus which causes the governor to stop and assume a position of rest, the lever 52 will be elevated a distance sufficient to raise the lever 38 and depress the valve-plug 12. The degree of this depression of the valve-plug can be regulated at will by the screw 56, and this adjustment may be such that fluid-pressure will be entirely cut off from the motor, so that the water will be continued at the same rate or quantity or the screw 56 may be so adjusted, and I prefer to so adjust it, that the valve-plug 12 will be depressed sufficiently to deliver fluid-pressure through pipe 6 and cause the gate to be shut down. The valve-plug then remains in this position until the gate is entirely shut, when the valve will be shifted to neutral position by the bifurcated lever 48 and rock-shaft 42, as heretofore explained.

Referring now to Figs. 4 to 12, the motor consists of an outer shell 60, having a closed head 61 and a removable head 62, of which the closed head has a depression 63, while the removable head has a packed bearing 64. 65 is a drum within the cylinder and of sufficiently smaller diameter to leave a pressure-chamber 66. This pressure-chamber is divided into compartments by means of blocks 67, carried by the cylinder and bearing against the periphery of the drum. The construction of these blocks is shown clearly in Fig. 12. They are formed with dovetailed recesses into which is poured Babbitt metal 68 while the drum is in place for the purpose of making a packing, the Babbitt metal being thereby caused to make an accurate fit against the periphery of the drum. The drum is further provided with radially-reciprocating gates 69, working in slots formed in the drum to receive them and which slots extend from side to side of the drum in its outer portions, so that said gates may make a tight connection with the cylinder. (See Fig. 4.) The drum has a trunnion 70, which fits snugly into the recess 63 and is formed with an axial oil-passage 71, communicating with the central cavity 72 of said drum, and a trunnion 73, which has turning-bearing in a removable ring 74, secured by screws 75 to the outer edge of the cylinder and forming the outer bearing or guide for the gates. The trunnion 74 also has a flange 76, which receives a boss 77, formed on the inner face of the removable head 62, and thus assists in holding the drum in place. 78 represents the shaft of the motor secured by pins 79 to the flange 76, and said shaft works in the packed bearing 64, as plainly seen from the drawings. 80 represents pitmen, the construction of which is seen in Fig. 7, and which are formed with elongated and perforated heads 81 and secured at 82 to the gates by means of pins 83, while their other ends 84 receive the wrist-pins 85 of the cranks 86, and thus impart reciprocating motion from the cranks to the gates. Each crank has a shaft 87, which projects outward through the wall of the drum and there receives a gear-wheel 88, which is secured by a pin 89, passing through the hub of the gear-wheel 90 and a perforation 91 in said shaft 87. As the gates approach the blocks they are drawn in flush with the periphery of the drum, so as to pass said blocks, and as soon as they pass the blocks they are projected again, so as to abut against the inner face of the cylinder and offer pressure-faces for the liquid-pressure which enters the openings 3 or 4. In order to withdraw or project each gate as it approaches or leaves the block, I arrange segmental racks 92, as shown in Fig. 5, at such points as to insure engagement with and rotation of each of the symmetrically-arranged gear-wheels 88 on the respective crank-shafts 87. Each rack and gear-wheel is so proportioned that it will cause a complete revolution of the crank during the transit for the purpose already explained. Interposed between the racks are segmental stops 93, projecting farther inward than the racks and adapted to engage flat spaces 94 in the gear-wheels, which are brought upon them at the proper time by the rotation of said gear-wheels, and by this means the crank, and through it the gate, is positively held in projected position and caused to make a liquid-tight joint at all times except when it is passing a block. The construction of the segmental rack will be understood upon reference to the detailed view, Fig. 10, while the construction of the locking-plate is shown in Fig. 11. To make a tight joint between the gates 69 and the walls of the openings in the drum through which gates pass, I provide undercut recesses 95, into which I pour Babbitt metal while the gate is in place. By this means a tight sliding joint is made, and the joint is readily replaced at any time. 97 represents the radial perforations through the gates for the passage of oil backward and forward during the reciprocating movement as the oil is replaced either in the central cavity of the drum or in the outer pressure-chamber. As will be understood, the central cavity is kept filled with oil, as is also the space around the gear-wheels, and this insures an easy movement and constant lubrication of the parts, so as to reduce wear to a minimum. A further important advantage of thus admitting the oil to all sides of the mechanism within the cylinder is that equal pressure is distributed in all directions, and a perfectly-balanced structure is obtained.

Having thus described my invention, the following is what I claim as new therein and desire to secure by Letters Patent:

1. In a water-governor, the combination of a winding-shaft, a reversible motor controlling said shaft, a suitable source of power from which said motor is operated, a valve controlling communication of said power, the governor to control the position of said valve to cause movement of the winding-shaft in opposite directions, a lever also controlling said valve, and a rock-shaft receiving opposite movements from the winding-shaft and engaging the valve-lever for actuating the valve when the winding-shaft reaches either limit of its movement, substantially as explained.

2. In a controller for water-powers, the combination of a winding-shaft, a fluid-pressure motor controlling said winding-shaft, a valve controlling the communication of fluid to said motor, a governor controlling said valve, a lever also controlling said valve, a rock-shaft having arms projecting on opposite sides of said lever, a toothed segment carried by said rock-shaft, and a worm-wheel on the winding-shaft engaging said segment, substantially as herein described.

3. In a controller for water-powers, the combination of a winding-shaft, a fluid-pressure motor controlling said winding-shaft, a valve controlling the communication of pressure to said motor, a pressure-tank with which said valve communicates, a storage-tank, and a pump having communication with said storage and pressure tanks for taking fluid from the former and delivering it under pressure in the latter, substantially as herein explained.

4. In a controller for water-powers, the combination of a winding-shaft, the fluid-pressure motor controlling said winding-shaft, a valve having communication in opposite directions with the motor, a governor controlling the position of said valve, a pressure-tank supplying fluid under pressure to said valve, a storage-tank into which said valve exhausts, a pump having communications with the respective tanks for taking fluid from one and delivering it under pressure to the other, and suitable means for operating said pump, substantially as herein explained.

MARCUS P. SCHENCK.

In presence of—
MORTIMER J. HALL,
EDWARD Q. KNIGHT.